(12) United States Patent
Shi et al.

(10) Patent No.: US 10,914,862 B2
(45) Date of Patent: Feb. 9, 2021

(54) SYSTEM AND METHOD FOR DETECTING OBJECT

(71) Applicants: Zheng Shi, Beijing (CN); Yongsheng Wan, Beijing (CN)

(72) Inventors: Zheng Shi, Beijing (CN); Yongsheng Wan, Beijing (CN)

(*) Notice: Subject to any disclaimer, the term of this patent is extended or adjusted under 35 U.S.C. 154(b) by 165 days.

(21) Appl. No.: 16/164,823

(22) Filed: Oct. 19, 2018

(65) Prior Publication Data

US 2019/0049623 A1 Feb. 14, 2019

Related U.S. Application Data

(63) Continuation-in-part of application No. PCT/CN2017/079896, filed on Apr. 10, 2017.

(30) Foreign Application Priority Data

Apr. 19, 2016 (CN) .......................... 2016 1 0245438

(51) Int. Cl.
*G01V 11/00* (2006.01)
*G01V 3/08* (2006.01)
(Continued)

(52) U.S. Cl.
CPC ................ *G01V 11/00* (2013.01); *G01V 3/08* (2013.01); *G06F 3/039* (2013.01); *G06F 3/044* (2013.01);
(Continued)

(58) Field of Classification Search
CPC ...... H04B 5/0012; G06F 3/044; G06F 3/0418
See application file for complete search history.

(56) References Cited

U.S. PATENT DOCUMENTS

| 2010/0123581 A1* | 5/2010 | Hatfield | ............ | G06K 19/0716 340/572.3 |
| 2013/0069014 A1* | 3/2013 | Lee | .......................... | H01B 1/22 252/512 |

(Continued)

FOREIGN PATENT DOCUMENTS

| CN | 102039045 | 5/2011 |
| CN | 103021512 | 4/2013 |
| CN | 104951170 | 9/2015 |

OTHER PUBLICATIONS

SIPO: International Search Report for PCT Application No. PCT/CN2017/079896 filed Apr. 10, 2017, dated Jul. 18, 2017.

*Primary Examiner* — Alvaro E Fortich

(57) ABSTRACT

The present invention provides a system for detecting an object. The system includes a processor, a capacitive sensor operatively linked to the processor, an RF reader, and an object with an embedded RFID tag. The sensing electrode of the capacitive sensor is made from a conductive paste. The RF reader is placed below the capacitive sensor and operatively linked to the processor. And the object is placed above the capacitive sensor. The detection ranges of the capacitive sensor and the RF reader overlap in space. And once the object enters the overlapped detection space, the capacitive sensor detects the object through capacitive coupling and the RF reader detects the object through reading the RFID tag. The use of conductive paste as touch electrode in the system not only substantially eliminates the bidirectional interference resulting from both capacitive sensing and RF identification, but also is convenient and sometimes cost effective.

10 Claims, 4 Drawing Sheets

(51) Int. Cl.
  *H04B 5/00*   (2006.01)
  *G06F 3/044*  (2006.01)
  *G06F 3/041*  (2006.01)
  *G06F 3/039*  (2013.01)

(52) U.S. Cl.
  CPC ......... *G06F 3/0418* (2013.01); *H04B 5/0012* (2013.01); *H04B 5/0056* (2013.01)

(56) References Cited

U.S. PATENT DOCUMENTS

| | | |
|---|---|---|
| 2015/0310238 A1 | 10/2015 | Shi et al. |
| 2016/0162036 A1* | 6/2016 | Shi .......................... G06F 3/044 345/174 |
| 2017/0123554 A1* | 5/2017 | Villar ....................... G06F 3/046 |
| 2017/0123562 A1* | 5/2017 | Cletheroe ............. G06F 3/0362 |

\* cited by examiner

SYSTEM AND METHOD FOR DETECTING OBJECT

CROSS-REFERENCE TO RELATED APPLICATION

This application is a continuation in part of International Patent Application No. PCT/CN2017/079896, entitled "System and Method for Detecting Object", filed on Apr. 10, 2017, which claims priority of Patent Application CN2016102454385, entitled "System and Method for Detecting Object", filed on Apr. 19, 2016. The entire disclosure of the above application is incorporated herein by reference.

TECHNICAL FIELD

The present invention provides a system and accompanying method for detecting an object, based on radio frequency identification technology, conductive paste technology and capacitive coupling technology.

BACKGROUND

When capacitive sensing technology is used for detecting an object, sensing of the presence of the object is achieved with touch electrodes. Meanwhile, if an RFID tag embedded in the object is read by an RF antenna, dual recognition of the object will be achieved by both capacitive sensing and RF communication.

In practice, this dual recognition of objects by both capacitive sensing and RF communication is rarely seen currently. In existing technologies, touch electrodes are made from metal or ITO, and touch electrodes and RF antennas are typically placed in two layers parallel to each other. As a result, there is bidirectional interference between touch electrodes and RF antennas. The interference from wireless signals sent by the RF antennas to the touch electrodes leads to significant baseline noise of signals of the touch electrodes, and thus reduces the detection sensitivity of the touch electrodes. On the other hand, the touch electrodes also produce interference and shielding to the wireless signals of the RF antennas, affecting the RF antennas' ability of reading RFID tags.

Typical electromagnetic shielding technologies cannot solve the problem, since wireless RF signals and electrical signals of touching electrodes need to overlap spatially, so as to achieve dual detection and recognition of objects.

Therefore, it is desired to develop a new system in which the dual recognition of objects by both capacitive sensing and RF communication can be achieved while the bidirectional interference between touch electrodes and RF antennas can be reduced substantially.

SUMMARY OF THE INVENTION

Aiming to solve the problems above, the present invention uses conductive paste to form capacitive sensing electrodes.

Conductive paste, such as carbon ink, is usually applied in electromagnetic wave screening, or production of touch electrodes at low cost. Conductive paste with low sheet resistance, e.g., less than $25\Omega/\square$, has similar properties to metal, and can form capacitive sensing electrodes in high quality. However, the two-layer structure of capacitive sensing electrodes made from conductive paste with low sheet resistance and RF antennas has a serious problem in the bidirectional interference resulting from both capacitive sensing and RF identification.

As shown in our experimental data, the capacitive sensing electrodes made from conductive paste with moderate sheet resistance, i.e., between $40\Omega/\square$ and $350\Omega/\square$, can still function well capacitively. Meanwhile, the two-layer structure of capacitive sensing electrodes made from conductive paste with moderate sheet resistance and RF antennas has much lower bidirectional interference as mentioned above.

The present invention provides a system for detecting an object. The system includes a processor, a capacitive sensor operatively linked to the processor, an RF reader, and an object with an embedded RFID tag. The sensing electrode of the capacitive sensor is made from a conductive paste. The RF reader is placed below the capacitive sensor and operatively linked to the processor. And the object is placed above the capacitive sensor. The detection ranges of the capacitive sensor and the RF reader overlap in space. And once the object enters the overlapped detection space, the capacitive sensor detects the object through capacitive coupling and the RF reader detects the object through reading the RFID tag.

In accordance with one embodiment of the present invention, the conductive paste is carbon ink, and the sheet resistance of the carbon ink is in the range of $40\sim350\Omega/\square$ after the carbon ink has fully solidified.

In accordance with one embodiment of the present invention, the system further includes multiple capacitive sensors to form a sensor array, and the object is placed above the sensor array, and the detection ranges of the capacitive sensors and the RF reader overlap in space.

In accordance with one embodiment of the present invention, the system further comprises multiple RF readers to form a reader array that is placed below the sensor array, and the detection ranges of the capacitive sensors and the RF readers overlap in space.

In accordance with one embodiment of the present invention, the capacitive sensor detects the object while the RF reader is in the process of reading the RFID tag of the object.

In accordance with one embodiment of the present invention, the RF reader detects the object while the capacitive sensor is in the process of sensing the capacitance changes by the placement of the object in the overlapped detection space.

The replacement of metal with conductive paste as touch electrodes substantially decreases the interference and screening from metal electrodes to RF radio waves, and thus maintains the RF reader's strong ability of reading RFID tags. Meanwhile, the use of conductive paste keeps the touch electrodes from being largely interfered by the RF signals. In addition, the conductive paste can be coated by printing, which is convenient and sometimes cost effective.

BRIEF DESCRIPTION OF THE DRAWINGS

To better illustrate the technical features of the embodiments of the present invention, various embodiments of the present invention will be briefly described in conjunction with the accompanying drawings. It should be obvious that the drawings are only for exemplary embodiments of the present invention, and that a person of ordinary skill in the art may derive additional drawings without deviating from the principles of the present invention.

DETAILED DESCRIPTION OF THE INVENTION

Reference will now be made in detail to various embodiments of the invention illustrated in the accompanying drawings. While the invention will be described in conjunction with the embodiments, it will be understood that this is not intended to limit the scope of the invention to these specific embodiments. The invention is intended to cover all alternatives, modifications and equivalents within the spirit and scope of invention, which is defined by the apprehended claims.

Furthermore, in the detailed description of the present invention, specific details are set forth in order to provide a thorough understanding of the present invention. However, it will be obvious to one of ordinary skill in the art that the present invention may be practiced without these specific details. In other instances, well known methods, procedures, components, and circuits are not described in details to avoid unnecessarily obscuring a clear understanding of the present invention.

Figure 1:
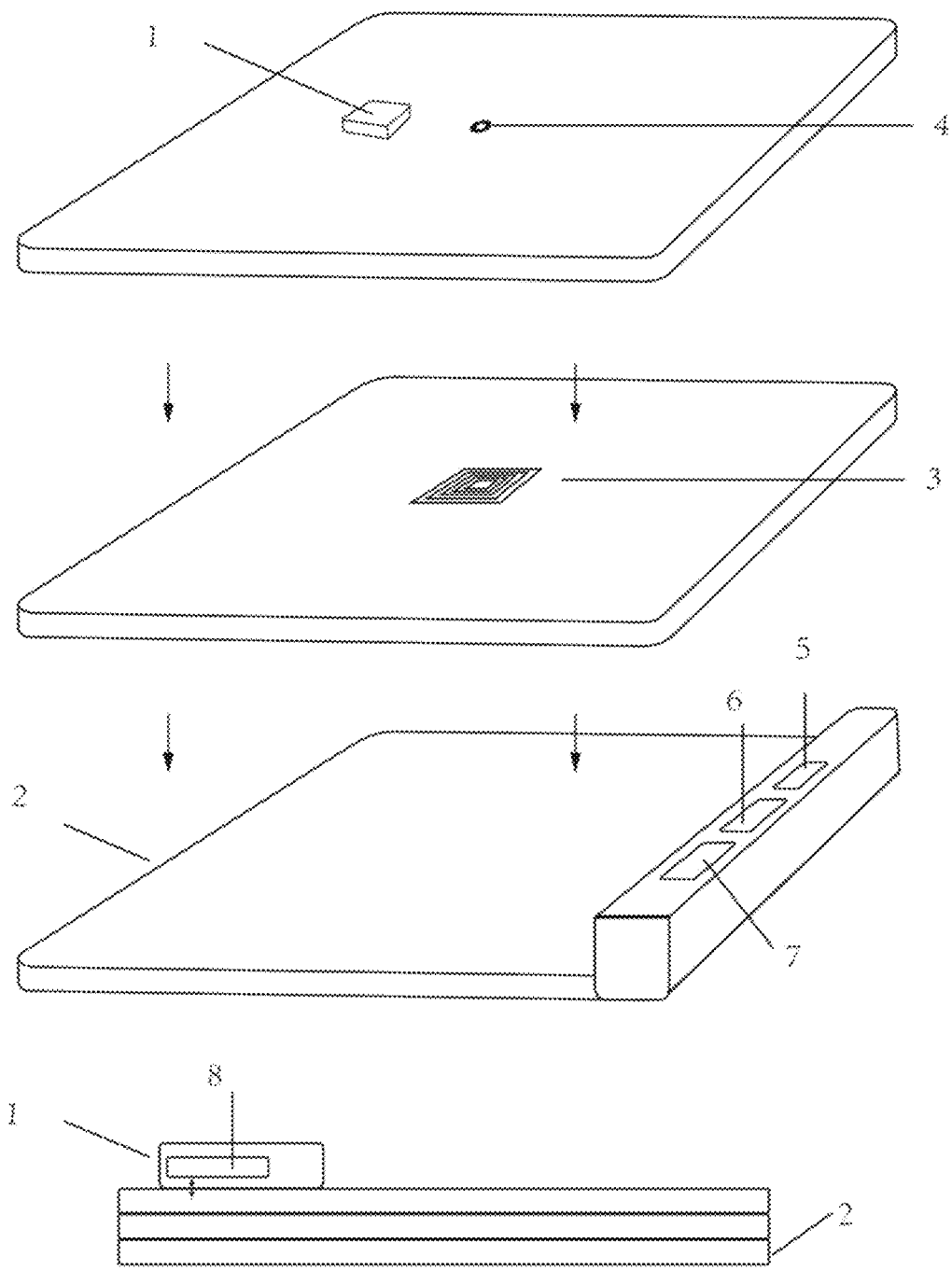
FIG. 1 is a schematic diagram illustrating the structure of the system for detecting an object in accordance with one embodiment of the invention.

As shown in FIG. 1, the present invention provides a system for detecting an object. The system includes a processor 6, a capacitive sensor 4 operatively linked to the processor 6, an RF reader 3, and an object 1 with an embedded RFID tag 8. The sensing electrode of the capacitive sensor 4 is made from a conductive paste. The RF reader 3 is placed below the capacitive sensor 4 and operatively linked to the processor 6. And the object 1 is placed above the capacitive sensor 4. The detection ranges of the capacitive sensor 4 and the RF reader 3 overlap in space. Once the object 1 enters the overlapped detection space, the capacitive sensor 4 detects the object 1 through capacitive coupling and the RF reader 3 detects the object 1 through reading the RFID tag 8.

The conductive paste is usually coated on a board by printing, and connected to the capacitive coupling module 5 through holes of the board, and further connected to the processor 6 through the capacitive coupling module 5. If the conductive paste is carbon ink, its sheet resistance is in the range of 40~350Ω/□ after having been fully solidified. Conductive carbon ink is composed of conductive fillers, adhesives, solvents, and additives.

Figure 2:
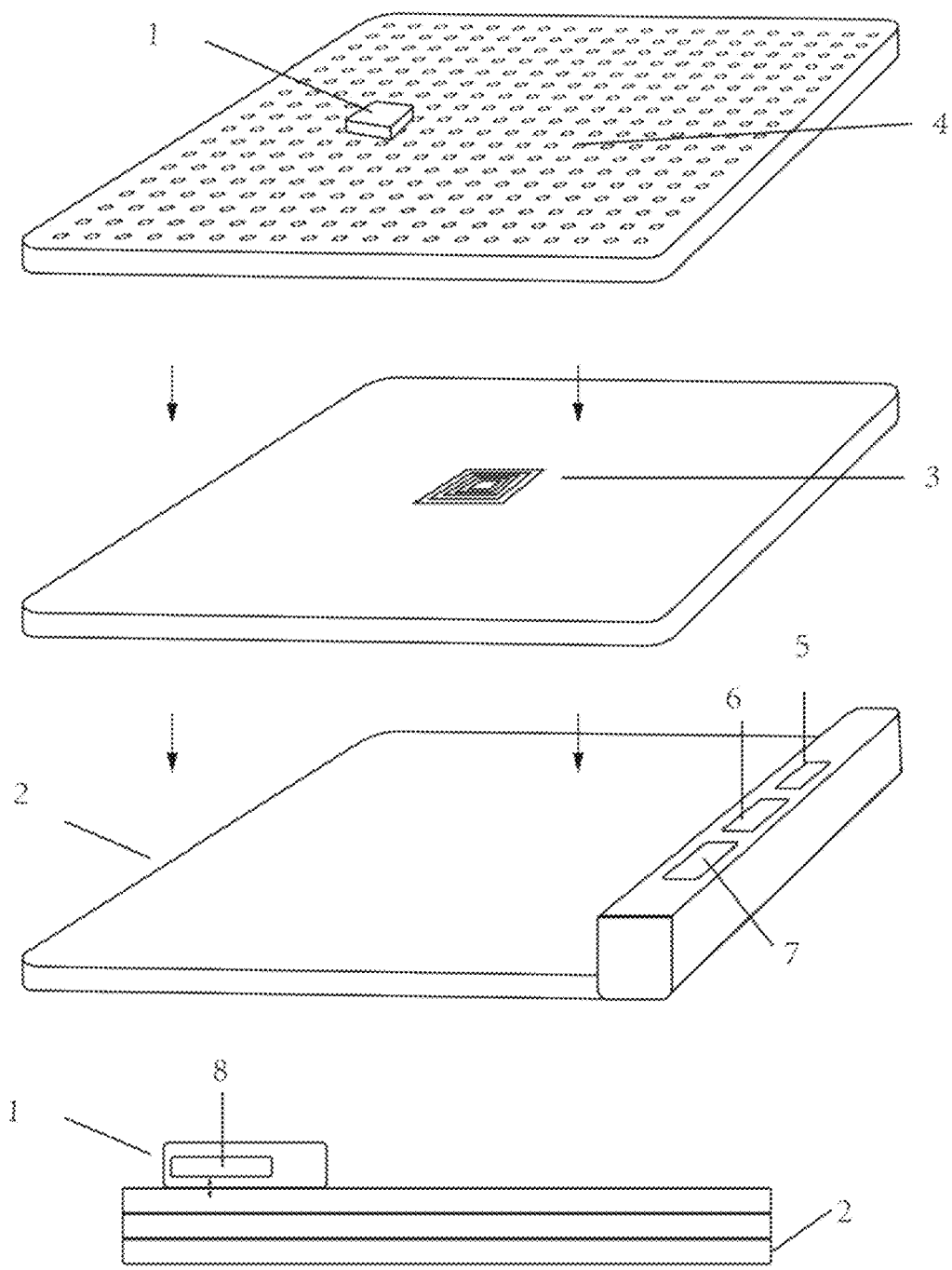
FIG. 2 is a schematic diagram illustrating an array of electrodes in accordance with one embodiment of the invention.

As shown in FIG. 2, multiple capacitive sensors 4 form a sensor array. Once the object 1 is placed above the sensor array, the detection ranges of the capacitive sensors 4 and the RF reader 3 overlap in space. When the object 1 is placed within the detection range of the RF reader 3, the signals sent or received by the RF reader 3 will pass through the sensor array and detect the RFID tag embedded in the object 1.

Figure 3:
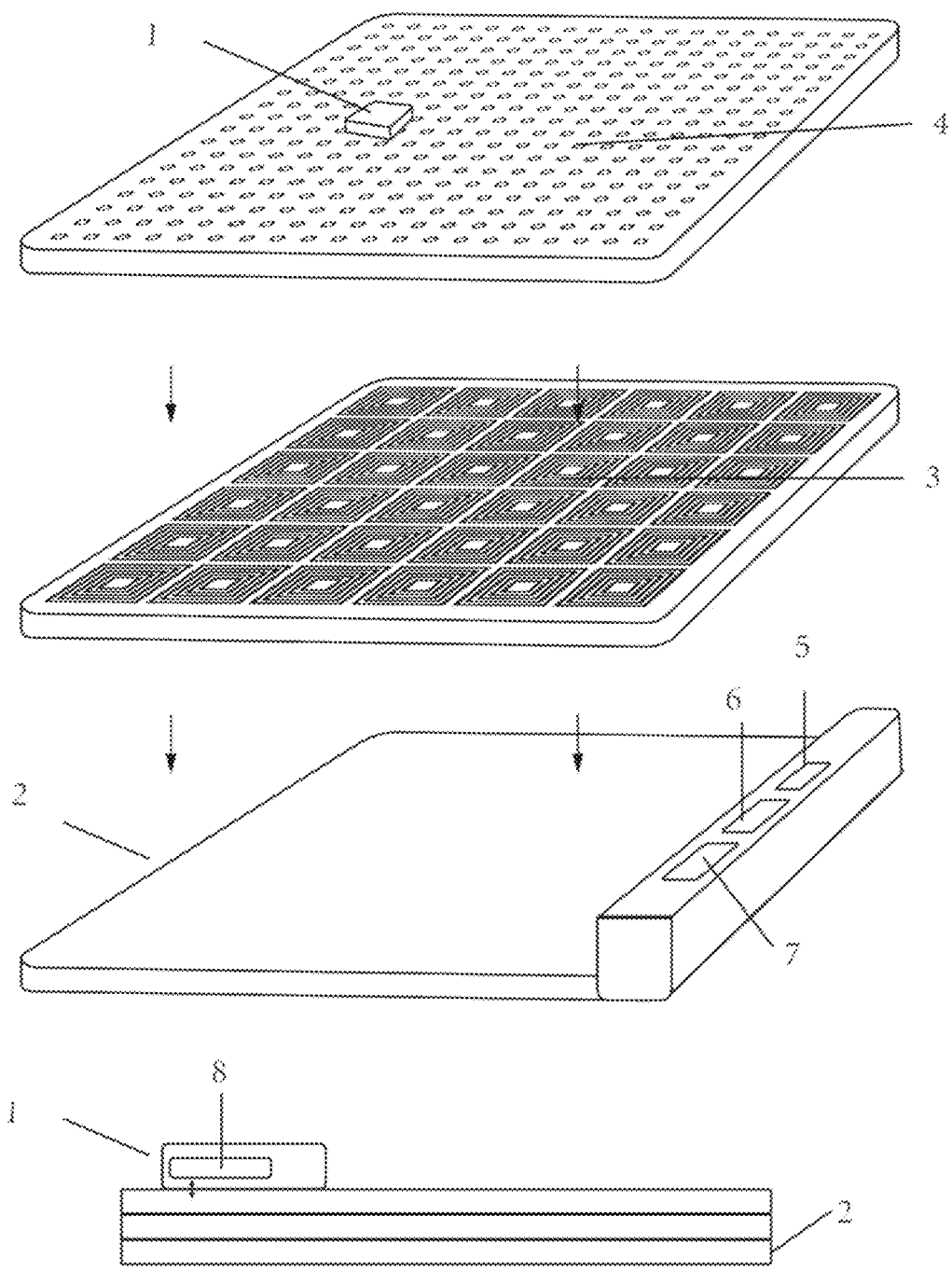
FIG. 3 is a schematic diagram illustrating an array of electrodes and an array of RF antennas in accordance with one embodiment of the invention.

And as shown in FIG. 3, multiple RF readers 3 form a reader array that is placed below the sensor array, and thus the detection ranges of the capacitive sensors 4 and the RF readers 3 overlap in space. When the object 1 is placed within the detection range of the RF reader 3, the signals sent or received by the reader array will pass through the sensor array and detect the RFID tag embedded in the object 1.

Also shown in FIG. 3, the object 1 is placed on an interactive surface that consists of three superimposed layers. The first layer of the interactive surface consists of the sensor array. The second layer is below the first layer and consists of the reader array. The third layer is on the bottom and consists of the substrate or base 2 of the interactive surface where the capacitive coupling module 5, the processor 6 and the RF detection module 7 are located.

Figure 4:
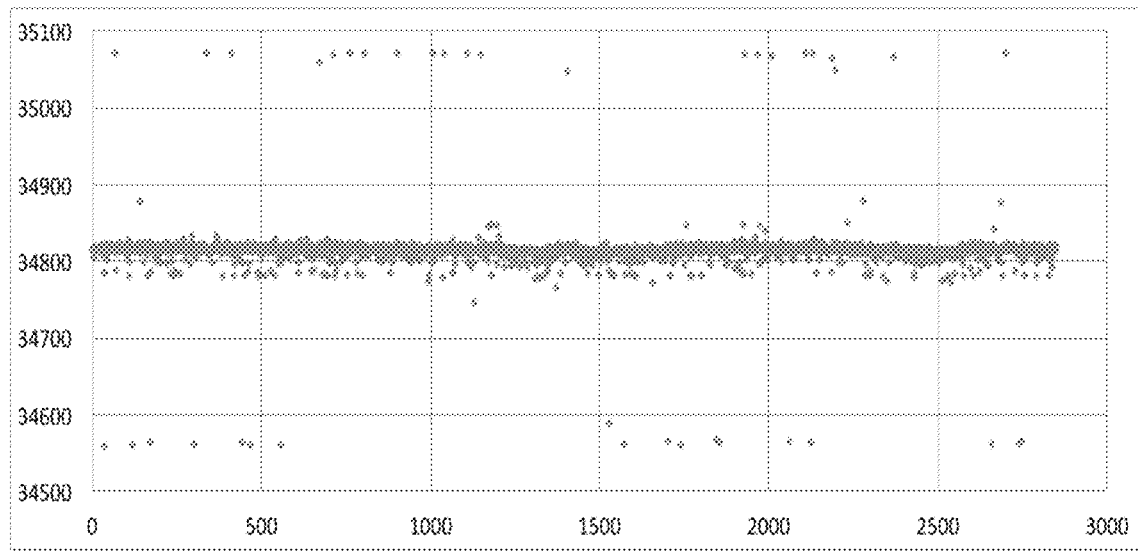
FIG. 4 is a chart illustrating the capacitance value changes experienced by a touch electrode made from ITO film in accordance with one embodiment of the invention.
Figure 5:
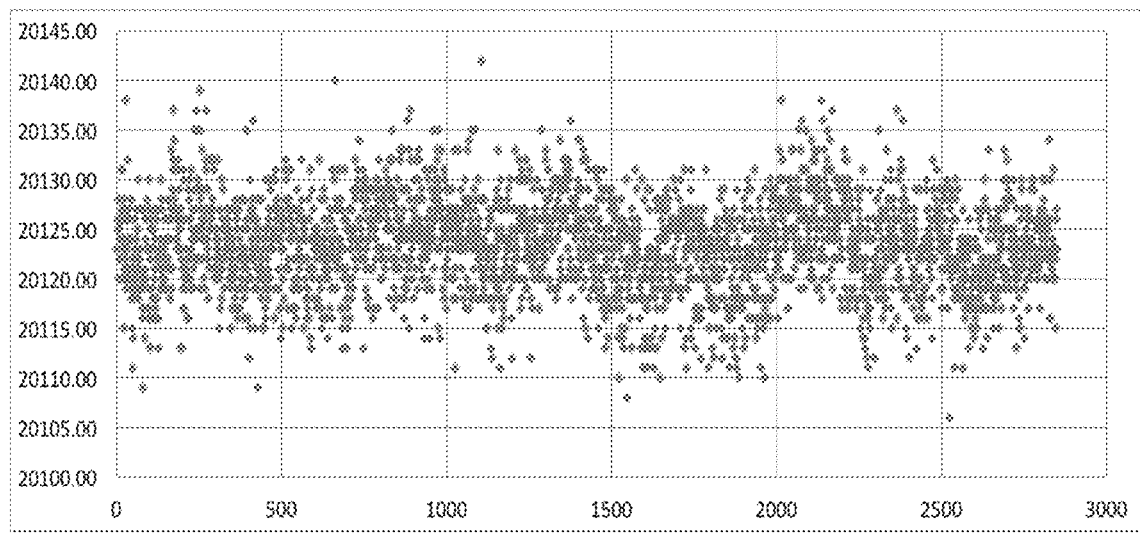
FIG. 5 is a chart illustrating the capacitance value changes experienced by a touch electrode made from carbon ink in accordance with one embodiment of the invention.

A comparison has been made to show how touch electrodes made from different materials function differently. In the experiment, the object 1 is placed on a single capacitive sensing electrode, and the capacitance value changes experienced by this electrode have been measured and recorded. As shown in FIG. 4 and FIG. 5, the fluctuation of the capacitance values leads to formation of a zonal baseline. In both FIG. 4 and FIG. 5, the y-axis depicts the capacitance value and the x-axis depicts the time as a unit in milliseconds. The time starts at 0 and finishes at 3,000 milliseconds, and one measurement is made every 11 milliseconds. As a result, a total of 2,800 measurements have been made.

As shown in FIG. 4, for a capacitive sensing electrode made from ITO film, it experiences capacitance value changes ranging from 34,570 to 35,070, with a maximal difference of approximately 500. These significant drifts may lead to malfunction of the electrode.

As shown in FIG. 5, for a capacitive sensing electrode made from carbon ink, it experiences capacitance value changes ranging from 20,106 to 20,140, with a maximal difference of only 34.

The less is the magnitude of the fluctuation of the capacitance values, the narrower is the baseline, and the higher is the signal-noise ratio. And it could be concluded that, with less interference from the touch electrodes 4 made from carbon ink to the RF signals, the detection sensitivity of the RF readers is substantially improved, compared to that of touch electrodes made from ITO film.

The present invention provides an object detection method, including the following steps:

Step 1: forming the sensing electrode of the capacitive sensor 4 with conductive paste;

Step 2: placing the RF reader 3 below the capacitive sensor 4, with the detection ranges of the capacitive sensor 4 and the RF reader 3 overlapping in space;

Step 3: placing the object 1 embedded with the RFID tag 8 in the overlapped detection space;

Step 4: detecting the object 1 through capacitive coupling by the capacitive sensor 4;

Step 5: detecting the object 1 through reading the RFID tag 8 by the RF reader 3.

The capacitive sensor 4 detects the object 1 while the RF reader 3 is in the process of reading the RFID tag 8 of the object 1.

The RF reader 3 detects the object 1 while the capacitive sensor 4 is in the process of sensing the capacitance change by the placement of the object 1 in the overlapped detection space.

When the object 1 is within the detection range of the RF reader 3, the RF reader 3 detects the RFID tag 8 embedded in the object 1 by wireless signals passing through the sensor array formed by multiple capacitive sensors 4. The sensing electrode of the capacitive sensor 4 is made from a conductive paste, and the object 1 is located at the layer above the sensor array.

When the object 1 is within the detection range of the reader array formed by multiple RF readers 3 and located at the layer below the sensor array, the reader array detects the RFID tag 8 embedded in the object 1 by wireless signals passing through the sensor array.

The invention claimed is:

1. A system for detecting an object, comprising:
   a processor;
   a capacitive sensor operatively linked to the processor, wherein a sensing electrode of the capacitive sensor is made from a conductive paste, wherein the conductive paste is carbon ink, and sheet resistance of the carbon ink is in the range of 40~350Ω/□ after the carbon ink has fully solidified;
   an RF reader, placed below the capacitive sensor and operatively linked to the processor;
   the object with an embedded RFID tag, placed above the capacitive sensor;
   wherein, the detection ranges of the capacitive sensor and the RF reader overlap in space, and wherein, upon the object entering the overlapped detection space, the capacitive sensor detects the object through capacitive coupling and the RF reader detects the object through reading the RFID tag.

2. The system of claim 1, further comprising a plurality of capacitive sensors to form a sensor array, wherein the object is placed above the sensor array, and wherein the detection ranges of the capacitive sensors and the RF reader overlap in space.

3. The system of claim 2, further comprising a plurality of RF readers to form a reader array, wherein the reader array is placed below the sensor array, and wherein the detection ranges of the capacitive sensors and the RF readers overlap in space.

4. The system of claim 1, wherein the capacitive sensor detects the object while the RF reader is in the process of reading the RFID tag of the object.

5. The system of claim 1, wherein the RF reader detects the object while the capacitive sensor is in the process of sensing the capacitance change by the placement of the object in the overlapped detection space.

6. A method for detecting an object, comprising:
   forming a sensing electrode of a capacitive sensor with conductive paste, wherein the conductive paste is carbon ink, and sheet resistance of the carbon ink is in the range of 40~350Ω/□ after the carbon ink has fully solidified;
   placing an RF reader below the capacitive sensor, wherein the detection ranges of the capacitive sensor and the RF reader overlap in space;
   placing the object embedded with an RFID tag in the overlapped detection space;
   detecting the object through capacitive coupling by the capacitive sensor;
   detecting the object through reading the RFID tag by the RF reader.

7. The method of claim 6, further comprising, forming a capacitive sensor array with a plurality of capacitive sensors, wherein the object is placed above the sensor array, and wherein the detection ranges of the capacitive sensors and the RF reader overlap in space.

8. The method of claim 7, further comprising forming an RF reader array with a plurality of RF readers, wherein the reader array is placed below the sensor array, and wherein the detection ranges of the capacitive sensors and the RF readers overlap in space.

9. The method of claim 6, further comprising, detecting the object by the capacitive sensor while the RF reader is in the process of reading the RFID tag of the object.

10. The method of claim 6, further comprising, detecting the object by the RF reader while the capacitive sensor is in the process of sensing the capacitance change by the placement of the object.

* * * * *